United States Patent
Burckart et al.

(10) Patent No.: US 7,685,289 B2
(45) Date of Patent: Mar. 23, 2010

(54) METHOD AND APPARATUS FOR PROXYING INITIAL CLIENT REQUESTS TO SUPPORT ASYNCHRONOUS RESOURCE INITIALIZATION

(75) Inventors: Erik John Burckart, Raleigh, NC (US); John Paul Cammarata, Raleigh, NC (US); Michael John Morton, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 10/906,989

(22) Filed: Mar. 15, 2005

(65) Prior Publication Data

US 2006/0212532 A1 Sep. 21, 2006

(51) Int. Cl.
G06F 15/16 (2006.01)
G06F 15/173 (2006.01)
(52) U.S. Cl. ............... 709/227; 709/217; 709/218; 709/238; 709/239; 709/242
(58) Field of Classification Search ............... 709/205, 709/217–219, 225, 227, 230, 238, 244, 239
See application file for complete search history.

(56) References Cited

U.S. PATENT DOCUMENTS

| | | | |
|---|---|---|---|
| 6,112,228 A * | 8/2000 | Earl et al. ............... | 709/205 |
| 6,182,141 B1 * | 1/2001 | Blum et al. ............ | 709/227 |
| 6,389,462 B1 | 5/2002 | Cohen et al. ........... | 709/218 |
| 6,424,992 B2 * | 7/2002 | Devarakonda et al. ...... | 709/203 |
| 6,438,652 B1 * | 8/2002 | Jordan et al. ........... | 711/120 |
| 6,463,508 B1 * | 10/2002 | Wolf et al. ............ | 711/133 |
| 6,513,061 B1 * | 1/2003 | Ebata et al. ............ | 709/203 |
| 6,742,043 B1 * | 5/2004 | Moussa et al. .......... | 709/232 |
| 6,754,709 B1 | 6/2004 | Gbadegesin ........... | 709/227 |
| 6,792,463 B1 | 9/2004 | Lamberton et al. ...... | 709/227 |
| 7,206,844 B2 * | 4/2007 | Gupta et al. ............ | 709/226 |
| 2002/0065074 A1 * | 5/2002 | Cohn et al. ............ | 455/422 |
| 2003/0009538 A1 | 1/2003 | Shah ................... | 709/219 |
| 2003/0195924 A1 * | 10/2003 | Franke et al. .......... | 709/203 |
| 2004/0210660 A1 | 10/2004 | Gbadegesin ........... | 709/227 |
| 2005/0021759 A1 * | 1/2005 | Gupta et al. ........... | 709/226 |

* cited by examiner

*Primary Examiner*—Saleh Najjar
*Assistant Examiner*—Farzana Huq
(74) *Attorney, Agent, or Firm*—Patents On Demand, PA; Brian K. Buchheit

(57) ABSTRACT

A set of programs allows a server computer that does not have an application installed to temporarily hand off a client request for the application to a peer server until the application is installed on the first server. The hand off is transparent to the client and temporary to the peer server. The server asynchronously starts the application, and when the application is ready for use, the first server stops sending requests to the peer server, and begins serving the requests. Since the first server has full session knowledge, it will be transparent to the client that the server servicing those requests temporarily changed.

6 Claims, 6 Drawing Sheets

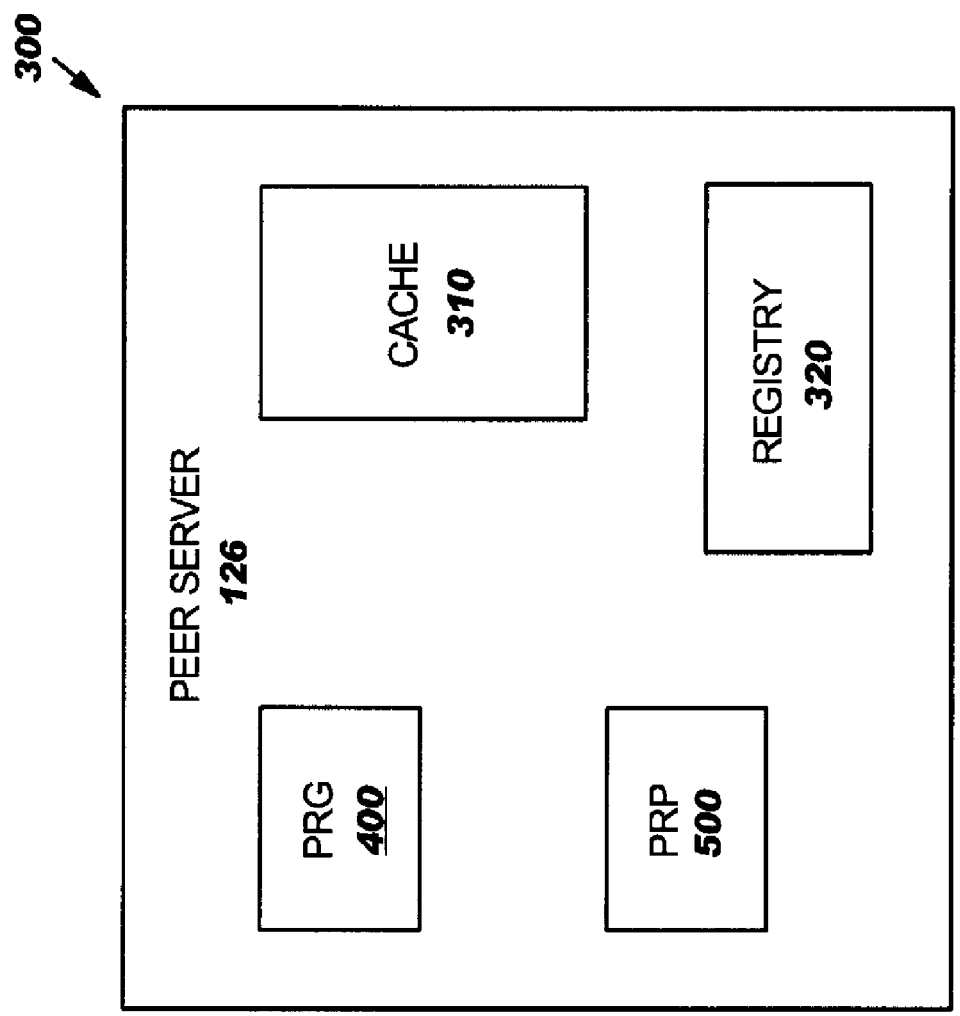

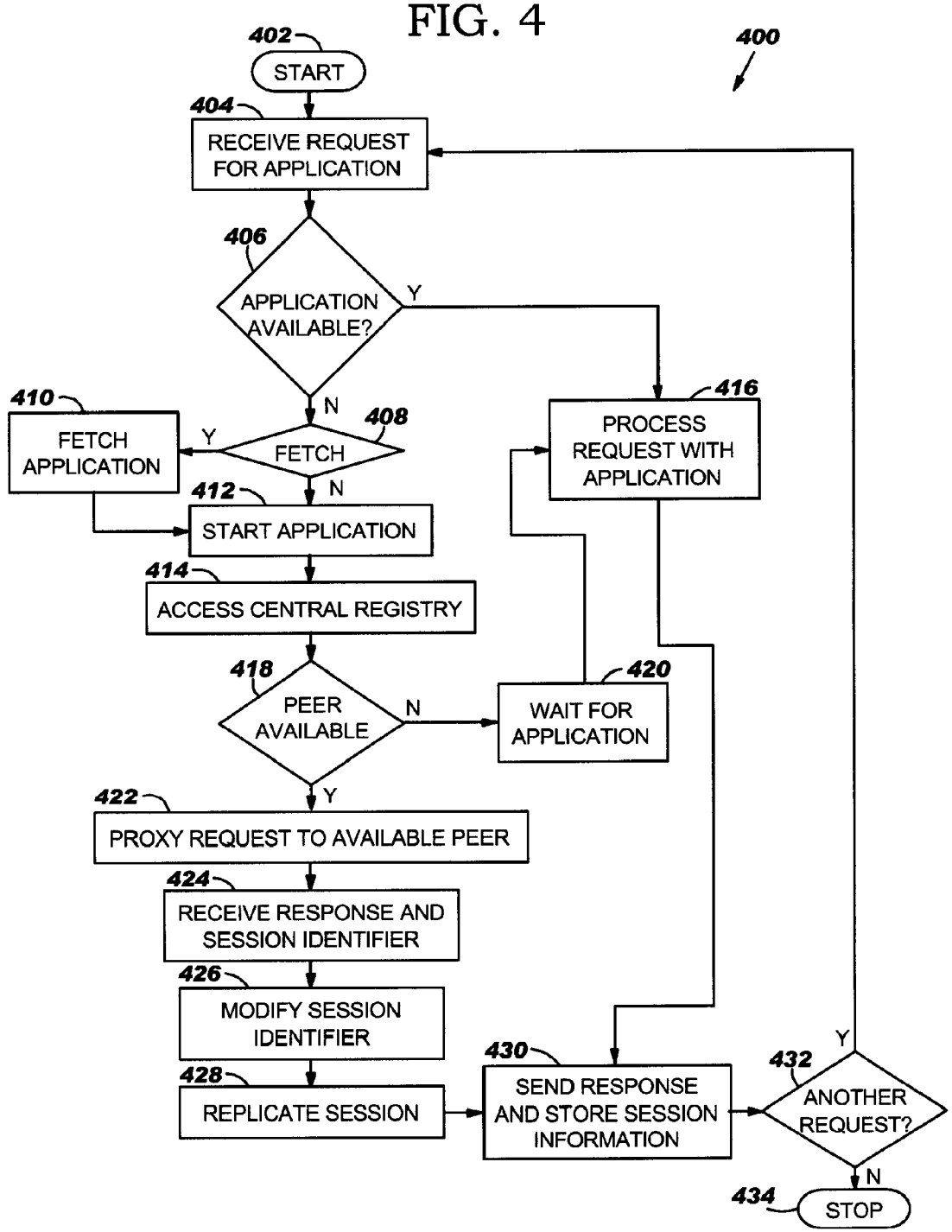

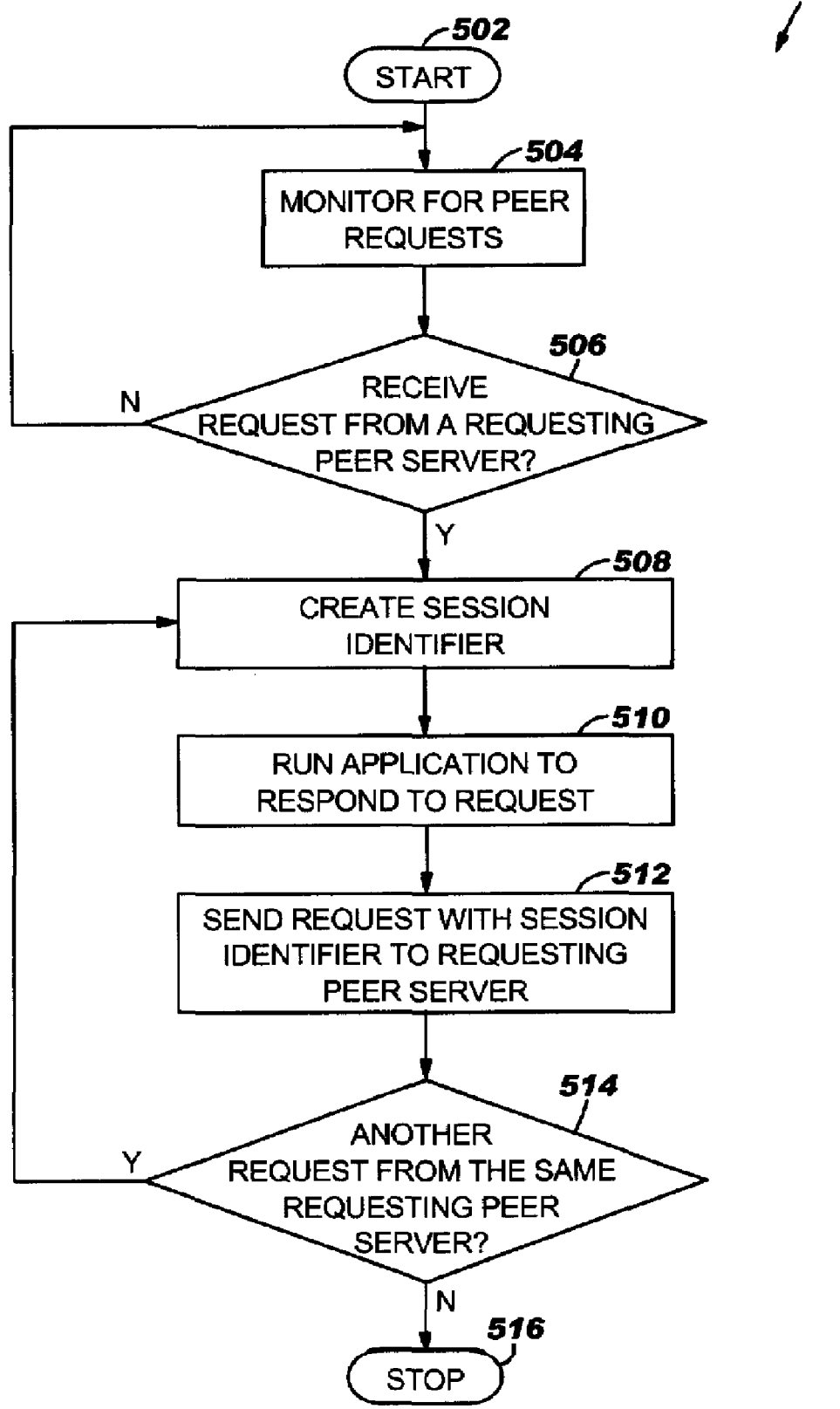

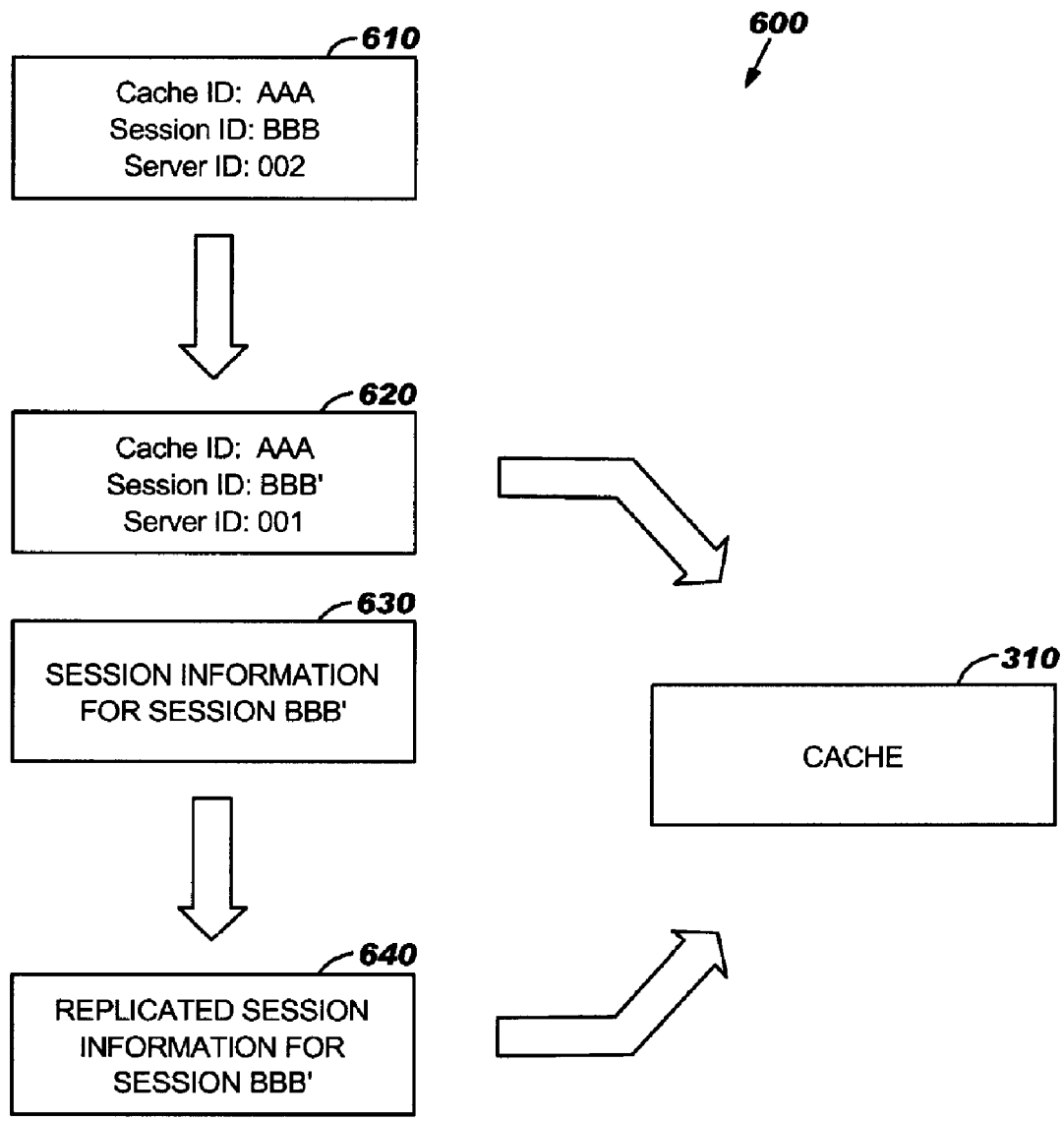

METHOD AND APPARATUS FOR PROXYING INITIAL CLIENT REQUESTS TO SUPPORT ASYNCHRONOUS RESOURCE INITIALIZATION

The disclosures made herein relate generally to computer networks and computer-implemented methodologies configured for improving server response time and, more particularly, to transparent proxying of requests to a peer server during the period of time in which the requesting server gets a needed application running.

BACKGROUND

The World Wide Web provides opportunities for the sharing of resources on an almost unlimited scale. Many software products support the creation of grids of interconnected resources. In conjunction with the grids, the software products enable businesses to access more computer capacity over the Internet on demand. The goal of developers for such software products is to provide users with a seamless flow of information and business processing.

One group of such software products is IBM's WebSphere®. WebSphere® encompasses tools for developing e-business applications and middleware for running Web Applications. WebSphere® Application Server (WAS) software deploys, integrates, executes and manages e-business applications (hereafter applications) from a network of application servers. WAS runs on a web server, a software program capable of servicing Hypertext Transfer Protocol (HTTP) requests. WAS is a Java 2 Platform, Enterprise Edition (J2EE), and its core components are Enterprise Java Beans (EJBs), Java Server Pages (JSPs), Java servlets and interfaces linking databases.

WAS deploys applications from a network of application servers. Typically, the network of application servers consists of peer servers where each of the servers in the network communicates with each other at the same level. These peer servers may include one or more clusters of application servers. A server cluster consists of a group of servers that are typically on different machines and have the same applications configured within them, but operate as a single logical server. Application servers in a cluster are configured to act as backup servers for user-session data. Memory to memory replication of data is performed using Java Message Service (JMS). A server cluster may be a group of clone servers where each server is an identically configured copy of an application server that may be used for workload management purposes.

WAS deploys applications over the Internet responsive to a request sent from a user's remote client computer using the client's web browser. The request contains the user's unique internet protocol (IP) address. When the client's web browser sends the request to the network of servers, one of the servers will run the application and make the application available to the remote client computer. The application may consist of a single resource or it may be a bundle of resources such as Java 2 Platform, Enterprise Edition (J2EE) application with numerous servlets and Enterprise Java Beans (EJBs).

WAS also manages the workload created by client requests. Load balancing is the monitoring of application servers and management of the workload on the servers. If one server exceeds its workload, requests are forwarded to another server with more capacity. One method by which WAS allocates requests among the peer servers on the network is through an intelligent workload router (IWR) that employs rules to decide which server receives a request. IBM's Network Dispatcher component, Content Based Routing (CBR) is one example on an IWR.

In order for the user to access the application from the remote client computer, the user's browser makes a protocol request to a WAS application server, and the server parses the protocol request to determine whether it has the application requested by the browser. When the server has the necessary application installed, there is no problem. However, a problem arises when a request is sent to an application server that does not have the necessary application running. The server must first install the application, and may have to fetch the application before it can be installed. Methods to start up applications asynchronously and remotely are known. However, the period of time that it takes to deploy the application causes an undesirable delay in the response time of the application server. Therefore, it is desirable to eliminate delay in commencement of the user session.

A solution to this problem is for the server, receiving a request but not having the necessary application running, to act as a proxy and to send the request to a peer server that has the application installed. Knowledge of which server has the necessary application installed may be obtained from a registry showing the applications that are installed on each of the servers. A registry is a repository that contains access and configuration information for users, systems, and software, and the use of such repositories is known. Such a registry may be provided by a central registry service which maintains peer servers and the resources available on those servers. In addition, proxying among peer servers is also known.

In addition to finding a peer server with the application running, the client request could be proxied to a peer server only for as long as necessary for the requesting server to install the required application. Once the requesting server has the necessary application installed, it could then process requests for the client throughout the remainder of the session. The temporary handing off to the peer server would be transparent to the client and to the IWR. The ability to proxy requests off and to alter the session information to have the client send requests back to the proxy is known. In addition, the ability to replicate connection session information across multiple servers is known.

When WAS makes an application available to the user's browser on the remote client computer an HTTP session is established. Connection information is created during the HTTP session which helps the server to maintain information about the remote client computer's requests. In WAS, a session is a series of requests to a servlet originating from the same user at the same browser. The servlets are Java programs that run on a Web server and extend the server's functionality by generating dynamic content in response to requests. A WAS Web server plug-in supports the Web server in communicating requests for the servlets, to the application server. In J2EE a session is an object used by a servlet to track a user's interaction with a Web application across multiple HTTP requests. An important component of the connection information is establishment of server affinity so that all requests during the session will go to the server that is providing the application from the user's initial access until the user exits the application.

Server affinity is important because many applications encountered on the Internet today, including "shopping carts" and home banking applications require that the current status of the application or "state" be maintained during the session. In other words, each request for a new web page in an application may require knowledge of the previous pages. Programmers have made provisions for maintaining state during a session in various ways including application programming interfaces (APIs) and cookies. The passing of the session information, and the shifting of subsequent requests from the user to the computer that received the session information is known as affinity. Thus when the request is sent to a server, the affinity information in the session information will ensure that the client will connect to the same server for all transactions during the session. However, once a server is assigned to the request, for those applications requiring that state be maintained, server affinity must be maintained during the time that the user at the remote client computer accesses the requested application, until the user exits the application.

Server affinity is maintained by making a unique server identifier a component of the session information. Some options available to maintain application state based on server affinity by making a unique server identifier part of session information are: (1) stickyness to source IP address, (2) SSL session identifiers, cookies, and URL rewriting. The suitability of each will be discussed below.

Stickyness to a source IP address is enabled by configuring the clustered port to be sticky. In doing so, all subsequent connections from the same source IP address are dispatched to the same server until the session ends, or until a configurable timeout period expires. This affinity strategy has some disadvantages. Some Internet Service Providers (ISPs) use proxies which collapse many client connections into a small number of source IP addresses. A large number of users who are not part of the session will be connected to the same server. Other proxies use a pool of user IP addresses chosen at random, even for connections from the same user, invalidating the affinity. These disadvantages weigh against using stickiness for the proposed proxy solution.

If clients are using Secure Sockets Layer (SSL) connections to the Web Server, then an SSL session identifier may be used. The SSL session identifier is generated from the SSL session information and is defined by the connection between the browser and Web server. Connecting to another Web server will reset the SSL connection and a new SSL session identifier will be generated. If the web server crashes, the user will lose the session. The session will continue to exist in the application server but the user will not have the correct SSL session identifier. If the application server crashes, then as long as persistent sessions are in use, the session will not be lost to the user. The disadvantages of the SSL session identifier weigh against its use for the proposed proxy solution.

Cookies have the advantage that the browser can be connected to any web server and there will be no effect on the session. A session identifier in the cookie is used by a server to locate the corresponding session. Cookie session identifiers will survive a web server crash and, provided persistent sessions are enabled, will also survive unavailability of the application server. The session lifetime is governed by the cookie lifetime. Once the session identifier in the cookie is set, a browser will send the cookie for all subsequent requests until the cookie expires. Cookies are the preferred way to communicate session information, and meet the requirements of the proposed proxy solution.

In WebSphere®, URL rewriting (or URL encoding) does not require users to enable cookies in their browsers, and yet still allows management of sessions. The process of setting up URL rewriting is not transparent to the Web application. It requires a developer to include specific commands to append the session information to the end of any HTTP link that will be used from the Web browser. Rewriting the URLs can only be done on dynamic HTML that is generated within WebSphere®. Session information will be lost if static HTML links are accessed, restricting the flow of site pages to dynamic pages only. From the first page, the user receives a session identifier and the Web site must continue using dynamic pages until the completion of the session. The only situation in which URL encoding excels over cookies is when users have not enabled cookies in their browsers, and in such a situation, URL encoding would be a suitable option for the proposed proxy solution.

In WAS, session affinity is maintained by appending a unique server identifier to the session identifier. When an HTTP session is created, its session identifier is passed back to the browser as part of a cookie or URL encoding. When the browser makes further requests, the cookie or URL encoding will be sent back to the Web server. The Web server plug-in examines the HTTP session identifier, in the cookie or URL encoding, and extracts the unique server identifier of the server handling the session, and forwards the request. The affinity information is stored in the session information object, ties the user to that particular server, and gives subsequent requests from that user to the proxy server.

In WAS, a client cookie has four parts: a cache identifier, a session identifier, a separator, and a server identifier. For example, a client cookie may be written as:

0001IWNTSHSZWWQFEPVNBOI5KY:t6tb10f8

The first four characters are used to identify the cache. When using cookies or URL rewriting, the characters before the ":" are used for the session identifier. The ":" is the separator. The last section, after the separator is used to point to the server which holds the session (the server identifier). Session information may comprise the session identifier, the last accessed time, the creation time, and the session-tracking mechanism.

However, when the request is sent to the peer server, the session information is also sent to the peer server, and when the request is returned to the proxy, the session information will contain affinity information that will cause follow on requests to continue to go to the peer server rather than to the requesting server. Therefore, the peer server will continue to get requests from the client web browser in addition to all of the requests that it would normally receive from the intelligent workload router. Such a routing will interfere in workload management. For example, the proxy server will receive the requests allocated to it by the IWR, and in addition, will receive the requests sent to it because the requesting server did not have the application running. Because the handover is a permanent handover for that session, the requesting server interferes in the workload management of the IWR.

Therefore, a need arises for a way to balance the resources by handing off a request to a peer server when necessary, but getting the session back to the originating server when it is ready to handle the request so that subsequent requests from the user will go to the originating server as soon as it is able as though no handing off had taken place. With such a capability the originating server would only pass off a request to a peer server until it had the application loaded and was able to process further requests, and at that time requests would no longer be sent to the proxy server. In such a situation, a need exists for a way to make a temporary and transitory handoff to a peer server without losing affinity to the requesting server.

SUMMARY OF THE DISCLOSURE

The invention that meets the needs described above is a set of programs that allows a server computer, that does not have an application installed, to temporarily hand off a client request for the application to a peer server until the application is installed on the first server. The hand off is transparent to the client and temporary to the peer server. The server asynchronously starts the application, and will begin to process requests within a session when the application is running.

The set of programs comprise a proxy request generator program and a proxy request response program stored in each of a plurality of peer servers. The proxy request generator program interacts with a registry to determine which peer server to hand off the request. The proxy request response program responds to the request and passes back the response and a session identifier to the first server. The proxy request generator program further modifies the affinity portions of the session information so that server affinity for the client request remains with the server and client request will continue to be routed to the first server by the intelligent workload routers. The first server asynchronously sets up session replication for that specific session between the peer server, who serviced the request and the first server.

The first server continues to receive subsequent requests for the application and to route them to the peer server, until the first server has the application prepared for use. When the application is ready for use, the first server stops sending requests to the second server, and begins serving the requests. Since the first server has full session knowledge, it will be transparent to the client that the server servicing those requests temporarily changed. The session identifier is changed slightly so that when the session information is replicated for high availability, two servers will not own the same session identifier.

Sessions are stored in a cache in one of two ways. First, sessions are stored in a central cache. Second sessions are stored where each node keeps an in memory cache and synchronizes with each other.

BRIEF DESCRIPTION OF THE DRAWING FIGURES

FIG. 3 depicts a representative memory residing in a peer server.

FIG. 4 is a flowchart of the proxy request generator (PRG) program.

FIG. 5 is a flowchart of the proxy request processor (PRP) program.

FIG. 6 is a process chart for modification of a session identifier and the associated session information.

DETAILED DESCRIPTION OF THE DRAWING FIGURES

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a set of computer programs that configure and enable one or more general-purpose computers to implement the novel aspects of the invention. For illustrative purposes, the inventive computer programs will be referred to below as the "Proxy Request Generator" (PRG) and the "Proxy Request Processor" (PRP).

Figure 1:
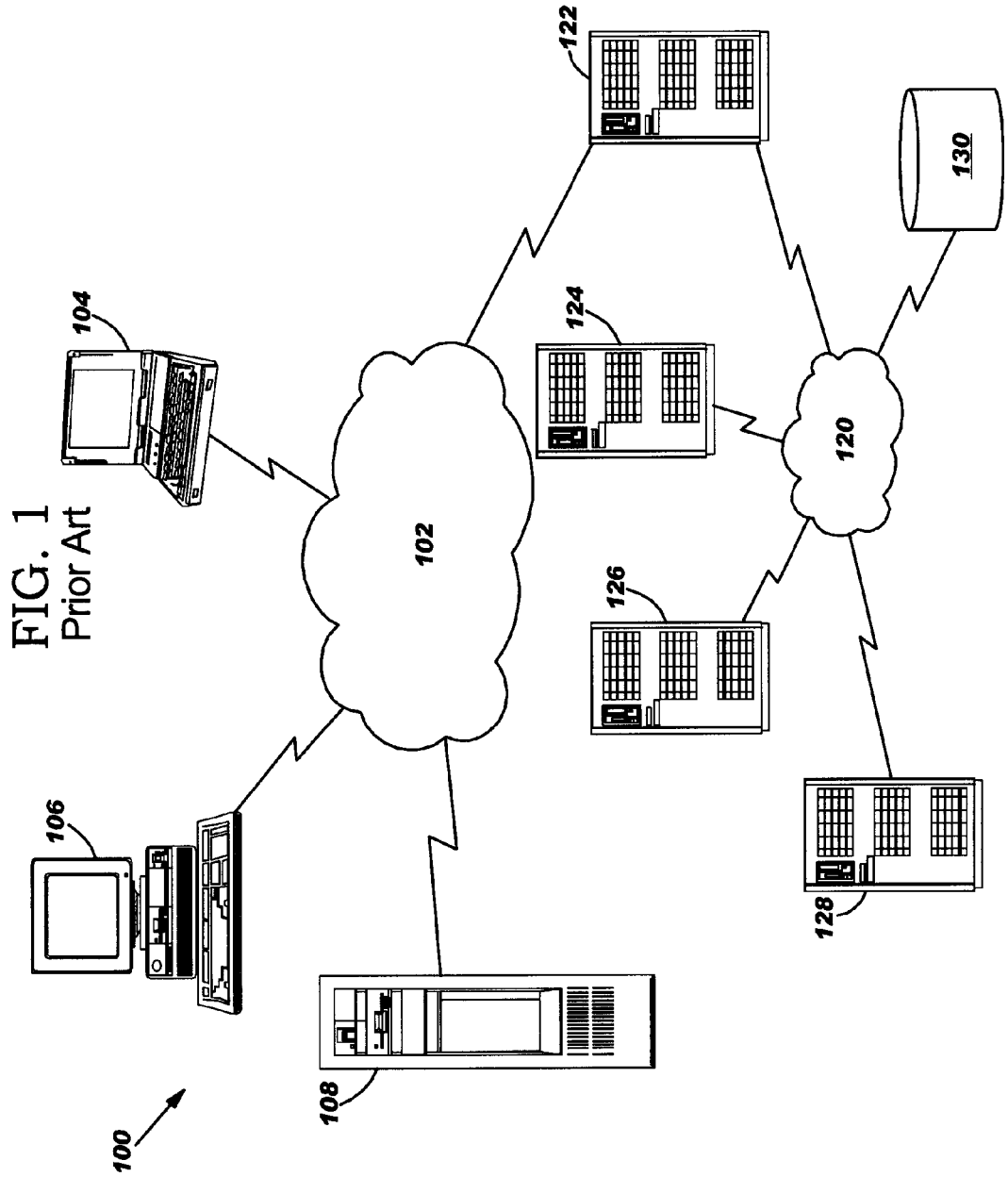
FIG. 1 depicts an exemplary network of peer servers connected to the Internet and a group of users by one of the peer servers.
Figure 2:
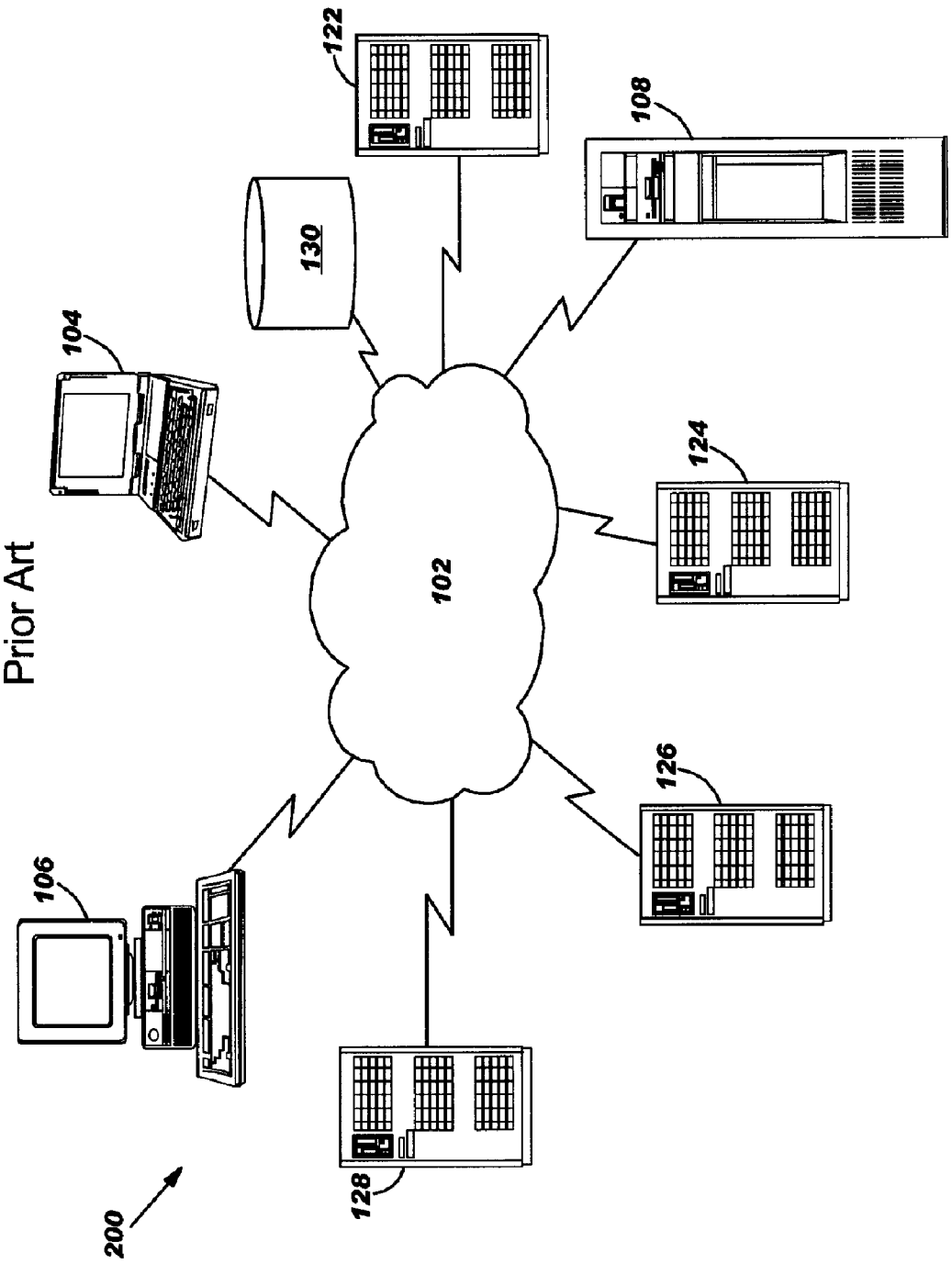
FIG. 2 depicts an exemplary group of peer servers, one of which is acting as an intelligent workload router, and a group of users, all connected by the Internet.

Additionally, the "Proxy Request Generator" and the "Proxy Request Processor" programs are described below with reference to an exemplary network of hardware devices, as depicted in FIG. 1 and FIG. 2. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 104, workstation computer 106, server computer 108, connected by the Internet to a network 120 of server computer's (122, 124, 126, and 128) and persistent storage 130 through server computer 122. Server computer 122 may contain software to act as an intelligent workload router for the server computer's connected by network 120. Network connection 102 comprises all hardware, software, and communications media necessary to enable communication between network nodes 104-108 and application server 122. Network connection 120 comprises all hardware, software, and communications media necessary to enable communication between network nodes 122-130.

Alternatively, network 200 depicts an exemplary network 200 which in the same manner as exemplary network 100 has only a limited number of nodes. In network 200 workstation 104, workstation 106 and server 108 are connected to application servers 122, 124, 126, 128 and persistent storage 130 by the Internet. Network connection 102 comprises all hardware, software, and communications media necessary to enable communication between network nodes 104-130. Unless otherwise indicated in context below, all network nodes use publicly available protocols or messaging services to communicate with each other through network connection 102.

Proxy Request Generator (PRG) program 400 and Proxy Request Processor (PRP) 500 are typically stored in a memory, represented schematically as memory 300 in FIG. 3. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 3 is included merely as a descriptive expedient and does not necessarily reflect any particular physical embodiment of memory 300. As depicted in FIG. 3, though, memory 300 may include additional data and programs. Of particular import to TMP 300, memory 300 may include cache 310 and registry 320. Alternatively, cache 310 and registry 320 may be centrally located in persistent storage such as persistent storage 130.

FIG. 4 depicts a flowchart of proxy request generator (PRG) 400. PRG 400 begins and receives a request for an application (404). PRG 400 determines whether the requested application is available (406). If the application is available, PRG 400 processes the request (416) and goes to step 430. If the application is not available, PRG 400 determines whether the application must be retrieved (408). If so, PRG 400 retrieves the application (410) If it is not necessary to retrieve the application in order to begin installation, PRG 400 begins the installation process (412).

Next, PRG 400 accesses the central registry to find a peer server that has the application installed (414). PRG 400 then determines whether the peer server (or any peer server with the application installed) is available (418). If not, PRG 400 waits for the application to be installed pursuant to step 412 (420) and when the application is installed proceeds to step 416. If the identified peer server is available, PRG 400 proxys the request to the identified peer server (422). PRG 400 receives the response and session identifier (424) and modifies the session identifier (426). (See FIG. 6 for discussion of the modification of the session identifier.) PRG 400 replicates the session information (428). Alternatively, the session information may be replicated by the peer server that sent the response and session identifier. In either case, replication may be configured as needed for a desired level of availability. PRG 400 sends the response and saves the session information with the modified session identifier (430). PRG 400 determines whether there is another request (432). If so, PRG 400 goes to step 404. If not, PRG 400 stops (434).

FIG. 5 depicts a flow chart for Proxy Request Processor (PRP) program 500. PRP 500 begins (502) and monitors the network for a request from a peer server (504). PRP 500 determines whether a request from a peer server has been received (506) and if not, returns to step 504. If so, PRP 500 creates a session identifier (508). Next PRP 500 runs the necessary application to respond to the request (510). PRP 500 sends the request with session identifier to the requesting peer server (512). PRP 500 determines whether another request from the same requesting server has been received (514). If so, PRP 500 goes to step 508. If not, PRP 500 stops (516).

FIG. 6 depicts an example of a process 600 for modifying and storing the session identifier and session information. In this example, the requesting server has the server identifier of 001. The server to which the request was proxyed has the server identifier of 002. Thus, at step 426 of PRG 400 (see FIG. 4), PRG 400 receives session identifier 610 containing a cache identifier of AAA, a session identifier of BBB and a server identifier of 002. PRG 400 modifies session information 610 to change the server identifier to 001 and the session identifier to BBB'. The server identifier is the affinity component of the session identifier that causes the user to send additional requests to the sever 001. In this way the server to which the request was handed off temporarily will only respond until the requesting server gets the application installed and can process the requests itself. Since the server identifier going back to the user is the server identifier of the requesting server, subsequent requests will continue to be sent to the requesting server, and the handoff to server 002 will be transparent to the user. For the same reason, the handoff will be transparent to an IWR. Session information for session BBB' 630 is replicated (640) and stored in cache 310.

Sessions are stored in a cache in one of two ways. First, sessions are stored in a central cache. Second sessions are stored where each node keeps an in-memory cache and synchronizes with each other.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for proxying requests for access to an application within a plurality of servers comprising:

at a first peer server connected to a plurality of peer servers by a network, receiving a request to run an application at the first server, the request coming from a client computer connected to the network, wherein the plurality of peer servers are application servers which operate as a single logical server;

responsive to determining that the application is not ready for use on the first peer server, asynchronously starting the application at the first peer server;

querying a registry to identify a second peer server of the plurality of peer servers;

asynchronously proxying the request to the second peer server, wherein the second peer server has the application installed and ready for use, and wherein a session is established in response to the request, the session defined by session information;

servicing the session at the second peer server while the first peer server is starting the application on the first peer server;

responsive to receiving a response to the request and the session information from the second peer server at the first peer server, modifying an affinity portion of the request so that subsequent client requests will continue to be routed to the first peer server;

at the second peer server, responsive to receiving the request from the first peer server, responding to the request and passing back the session information for the request to the first peer server; and servicing the session at the first peer server with the application running on the first peer server subsequent to receiving the session information at the first peer server from the second peer server.

2. The method of claim 1 further comprising the step of: a synchronously setting up session replication for that specific session between the second peer server and the first peer server.

3. The method of claim 1 further comprising the step of: continuing to receive subsequent requests for the application from the client and to route them to the second peer server until the first peer server has the application prepared for use.

4. The method of claim 1 further comprising the step of: routing the request from the client computer to the network through an intelligent workload router.

5. The method of claim 1 wherein, responsive to having the application ready for use, the first peer server stops sending requests to the second peer server, and begins servicing the requests itself.

6. The method of claim 1 wherein the first peer server has full session knowledge so that it will be transparent to the client computer that the server servicing those requests temporarily changed.

* * * * *